United States Patent
Jensen (10) Patent No.: US 12,015,496 B2
(45) Date of Patent: *Jun. 18, 2024

(54) TAKING A BREAK AFTER SEAMLESS TRANSITION BETWEEN NETWORK CONFERENCES

(71) Applicant: Zoom Video Communications, Inc., San Jose, CA (US)

(72) Inventor: Patrick John Jensen, Fresno, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,223

(22) Filed: Dec. 13, 2022

(65) Prior Publication Data

US 2023/0115155 A1    Apr. 13, 2023

Related U.S. Application Data

(63) Continuation of application No. 17/350,403, filed on Jun. 17, 2021, now Pat. No. 11,539,539, which is a
(Continued)

(51) Int. Cl.
*H04N 7/15* (2006.01)
*H04L 12/18* (2006.01)
(Continued)

(52) U.S. Cl.
CPC ...... *H04L 12/1822* (2013.01); *H04L 12/1818* (2013.01); *H04L 67/54* (2022.05); *H04N 7/15* (2013.01); *H04R 3/00* (2013.01)

(58) Field of Classification Search
CPC . H04L 67/54; H04L 12/1822; H04L 12/1818; H04L 65/1083; H04L 65/403; H04N 7/15; H04N 7/147
(Continued)

(56) References Cited

U.S. PATENT DOCUMENTS 8,767,035 B2    7/2014  Baldwin
9,231,901 B1*   1/2016  Cushing .................. H04L 51/52
(Continued)

FOREIGN PATENT DOCUMENTS

EP    2237533 A1    10/2010

OTHER PUBLICATIONS

U.S. Appl. No. 17/039,498, "Final Office Action", dated Apr. 21, 2022, 22 pages.
(Continued)

*Primary Examiner* — Melur Ramakrishnaiah
(74) *Attorney, Agent, or Firm* — Kilpatrick Townsend & Stockton LLP (57) ABSTRACT

Methods and apparatus for taking a break after seamless transition between network conferences. In an embodiment, a method for taking a break after a transition between network conferences includes operations of attending a first network conference using a first conference state and a conferencing application, and displaying Up-Next conference status about a second network conference. The method also includes operations of receiving a request to enter a break mode after joining the second network conference, joining the second network conference using the first conference state and the conferencing application, and transmitting a break mode icon to participants in the second network conference.

20 Claims, 8 Drawing Sheets

METHOD FOR SEAMLESS CONFERENCE TRANSITION

Related U.S. Application Data continuation of application No. 17/039,764, filed on Sep. 30, 2020, now Pat. No. 11,070,385.

(51) Int. Cl.
*H04L 67/54* (2022.01)
*H04R 3/00* (2006.01)

(58) Field of Classification Search
USPC .......................................... 348/14.01–14.16
See application file for complete search history.

(56) References Cited

U.S. PATENT DOCUMENTS

| | | | |
|---|---|---|---|
| 10,375,125 | B2 | 8/2019 | Rosenberg et al. |
| 11,070,385 | B1 | 7/2021 | Jensen |
| 11,539,539 | B2 | 12/2022 | Jensen |
| 2005/0071427 | A1 | 3/2005 | Dorner et al. |
| 2007/0101287 | A1 | 5/2007 | Pagan |
| 2007/0263078 | A1* | 11/2007 | Shah .................. H04N 7/147 348/E7.083 |
| 2011/0022968 | A1* | 1/2011 | Conner ................ H04N 7/15 715/753 |
| 2011/0205328 | A1 | 8/2011 | Ozeki et al. |
| 2011/0271212 | A1 | 11/2011 | Jones et al. |
| 2012/0011205 | A1 | 1/2012 | Paulsami et al. |
| 2012/0144320 | A1* | 6/2012 | Mishra ................ H04N 7/155 715/753 |
| 2013/0290870 | A1 | 10/2013 | Jones et al. |
| 2016/0062620 | A1 | 3/2016 | Simon et al. |
| 2016/0234264 | A1 | 8/2016 | Coffman et al. |
| 2016/0267228 | A1 | 9/2016 | Van Wyck et al. |
| 2016/0294892 | A1 | 10/2016 | Hata |
| 2018/0012191 | A1 | 1/2018 | Rosenberg |
| 2018/0213013 | A1* | 7/2018 | Adams ............... H04L 65/1083 |
| 2019/0019162 | A1 | 1/2019 | Yang et al. |
| 2020/0021453 | A1 | 1/2020 | Advani et al. |
| 2020/0112450 | A1 | 4/2020 | Chhabra et al. |
| 2020/0382646 | A1* | 12/2020 | Rao ..................... H04L 51/18 |
| 2021/0058263 | A1 | 2/2021 | Fahrendorff et al. |
| 2021/0058436 | A1* | 2/2021 | Mombourquette ................... H04L 65/4015 |

OTHER PUBLICATIONS

U.S. Appl. No. 17/039,498, "Non-Final Office Action", dated Nov. 5, 2021, 18 pages.
U.S. Appl. No. 17/039,682, "Advisory Action", dated Mar. 10, 2022, 3 pages.
U.S. Appl. No. 17/039,682, "Final Office Action", dated Jan. 18, 2022, 10 pages.
U.S. Appl. No. 17/039,682, "Non-Final Office Action", dated Jul. 30, 2021, 9 pages.
U.S. Appl. No. 17/039,682, "Non-Final Office Action", dated May 18, 2022, 17 pages.
U.S. Appl. No. 17/039,764, "Notice of Allowance", dated Jun. 7, 2021, 5 pages.
U.S. Appl. No. 17/350,403, "Non-Final Office Action", dated Apr. 1, 2022, 13 pages.
U.S. Appl. No. 17/350,403, "Notice of Allowance", dated Aug. 24, 2022, 6 pages.
PCT/US2021/052547, "International Search Report and Written Opinion", dated Mar. 14, 2022, 18 pages.
PCT/US2021/052547, "Invitation to Pay Additional Fees and, Where Applicable, Protest Fee", dated Jan. 21, 2022, 14 pages.
U.S. Appl. No. 17/039,498, "Final Office Action", dated Oct. 5, 2023, 26 pages.
U.S. Appl. No. 17/039,498, "Non-Final Office Action", dated May 4, 2023, 26 pages.
U.S. Appl. No. 17/039,682, "Final Office Action", dated Dec. 16, 2022, 16 pages.
U.S. Appl. No. 17/039,682, "Non-Final Office Action", dated May 9, 2023, 13 pages.
PCT/US2021/052547, "International Preliminary Report on Patentability", dated Apr. 13, 2023, 11 pages.

\* cited by examiner

METHOD OVERVIEW FOR SEAMLESS CONFERENCE TRANSITION

FIG. 5

METHOD FOR SEAMLESS CONFERENCE TRANSITION

TAKING A BREAK AFTER SEAMLESS TRANSITION BETWEEN NETWORK CONFERENCES

CROSS-REFERENCE TO RELATED APPLICATIONS

This application is a continuation application of U.S. patent application Ser. No. 17/350,403, filed Jun. 17, 2021, titled "Taking a Break After Seamless Transition Between Network Conferences," now U.S. Pat. No. 11,539,539, which is a continuation of U.S. patent application Ser. No. 17/039,764, filed Sep. 30, 2020, titled "Methods and Apparatus for Taking a Break After Seamless Transition Between Network Conferences," now U.S. Pat. No. 11,070,385, the entirety of both of which are hereby incorporated by reference.

The present application contains subject matter that may be related to the subject matter in U.S. patent application Ser. No. 17/039,498, titled "Methods and Apparatus for Displaying Up-Next Conference Status for Seamless Transition Between Network Conferences," filed on Sep. 30, 2020, and U.S. patent application Ser. No. 17/039,682, titled "Methods and Apparatus for Seamless Transition Between Network Conferences," filed on Sep. 30, 2020, both of which are assigned to the assignee of the present application.

FIELD

The exemplary embodiments of the present invention relate to the field of network communication. More specifically, the exemplary embodiments of the present invention relate to methods and apparatus for seamless transition between network conferences.

BACKGROUND

With the increasing popularity of digital electronics and network communications, networked conferences have become more popular. For example, distance learning, telehealth, tutoring, and/or training conferences are only few types of network conferences attended by users.

Typically, to attend conferences throughout the day, a user maintains a list or calendar of conference events to which the user plans to attend. Unfortunately, the user must constantly review the calendar, log in and out of conferences, and setup equipment, such as microphones and video equipment for each conference. Thus, it is very easy for users to spend a lot of time on setup and conference switching. Within this constant back and forth to join new conferences, the user also needs to have some time for breaks.

Therefore, it is desirable to have a mechanism that provides seamless and time-efficient transitions between network conferences.

SUMMARY

In various embodiments, methods and apparatus are provided for seamless transition between network conferences. In an exemplary embodiment, a conference transition apparatus is provided that allows a user to participate in a current conference and to see Up-Next status information about an upcoming conference. In an embodiment, the Up-Next status information includes a start time of the upcoming conference and images of participants that have already joined the upcoming conference. The user can then transition to the next conference by selecting a join next conference selector. This selection will cause the user to leave the current conference and join the next conference using the same client application and conference state used in the previous conference, which greatly reduces the time to transition between conferences. The user can also transition to the next conference by selecting a break selector. This selection will cause the user to leave the current conference and join the next conference using the same client application and conference state as before. However, the user's live video stream will be replaced with a break icon and the user's microphone will be muted indicating that the user is on a break. After the break, the user can resume participation the newly joined conference.

In an embodiment, a method is provided for taking a break after a transition between network conferences. The method includes operations of attending a first network conference using a first conference state and a conferencing application, and displaying Up-Next conference status about a second network conference. The method also includes operations of receiving a request to enter a break mode after joining the second network conference, joining the second network conference using the first conference state and the conferencing application, and transmitting a break mode icon to participants in the second network conference.

In an embodiment, an apparatus is provided for taking a break after a transition between network conferences. The apparatus comprises a transceiver configured to communicate with a network server to attend a first network conference utilizing a first conference state and a conferencing application, and a display screen that displays Up-Next conference status about a second network conference. The apparatus also comprises a processor that performs operations of: receiving a request to enter a break mode after joining the second network conference; joining the second network conference using the first conference state and the conferencing application; and transmitting a break mode icon to participants in the second network conference.

In an embodiment, a non-transitory computer readable medium is provided on which are stored program instructions that, when executed by one or more processors, cause the one or more processors to take a break after a transition between network conferences by performing operations of: attending a first network conference using a first conference state and a conferencing application; displaying Up-Next conference status about a second network conference; receiving a request to enter a break mode after joining the second network conference; joining the second network conference using the first conference state and the conferencing application; and transmitting a break mode icon to participants in the second network conference.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the present invention disclose systems, methods, and apparatus for providing seamless transitions between network conferences.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine or computer for execution. The instructions may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

Figure 1:
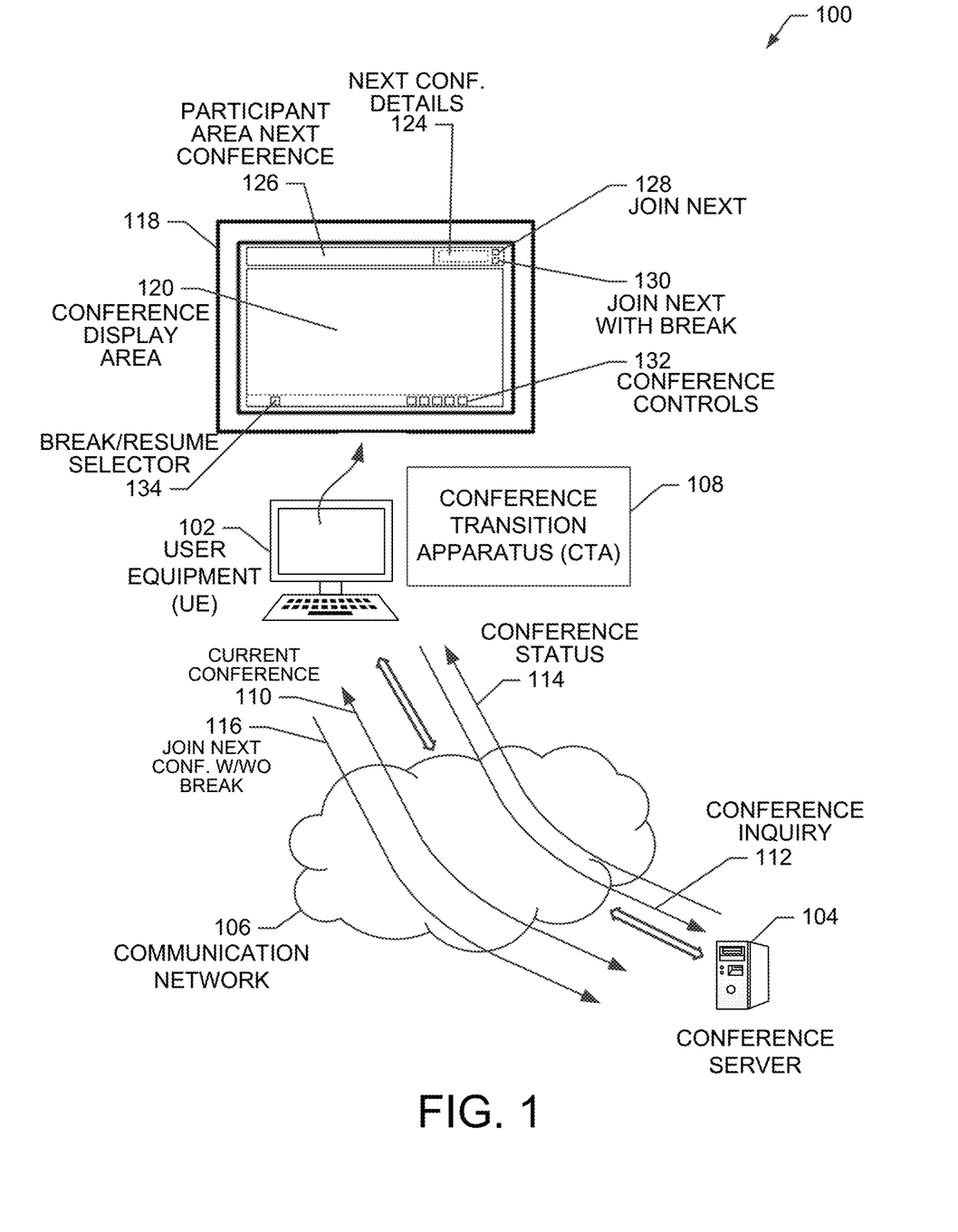
FIG. 1 shows a diagram illustrating a communication network in which a conference transition apparatus is provided that allows an attendee to seamlessly transition between network conferences.

FIG. 1 shows a diagram illustrating a communication network 100 in which a conference transition apparatus (CTA) 108 is provided that allows a user to seamlessly transition between network conferences.

The communication network 100 comprises user equipment (UE) 102 and conference server 104 that are configured to communicate utilizing a communication network 106. In an embodiment, the communication network 106 comprises a wired communication network, a wireless communication network, or a combination of wired and wireless communication networks. The conference server 104 is configured to communicate over the network 106 to facilitate network conferences between multiple user devices of various types (e.g., desk-top computers. lap-top computers, tablets, smart phones, etc.) using any type of network protocol to provide secure network conferences in accordance with various exemplary embodiments.

In an embodiment, the user equipment 102 comprises the conference transition apparatus 108. The CTA 108 operates to provide seamless transition between network conferences. During operation, the user of user equipment 102 participates in a current network conference 110 that is facilitated by the server 104. For example, the user equipment 102 utilizes a client application to participate in the current conference. During this conference, the CTA 108 accesses a calendar of the user to determine a conference identifier of the next conference the user is scheduled to attend. The CTA 108 transmits a conference inquiry 112 to the conference server 104. The conference inquiry requests information about the upcoming conference identified by the conference identifier. The conference server 104 responds to the conference inquiry by transmitting conference status 114. The conference status 114 identifies the status of the upcoming conference and provides images of conference attendees that have already joined the upcoming conference.

The CTA 108 receives the conference status 114 and displays this information to the user. In an embodiment, the status information is displayed a short time before the start time of the upcoming conference. For example, a display 118 of the UE 102 illustrates how the status information is displayed to the user. The display 118 includes a conference display area 120 that displays information about the current conference 110. The display 118 also includes an Up-Next status area 124 that displays details of the next conference. These details include, but are not limited to, the conference host, conference topic, start time, and any other suitable details. The display 118 also includes a next conference participant area 126 that displays images of participants that have already joined the next conference. The display 118 also includes a join next conference selector 128 and a join with break selector 130. These selectors allow the user to seamlessly join the next conference with or without a break. The display 118 also includes conference controls 132 and a break/resume selector 134. The conference controls 132 provide a variety of controls that can be used adjust conference settings while participating in a conference. The break/resume selector 134 allows a user to take a break during a current conference and to resume participation in that conference when the break is over.

After displaying information about the next conference to the user, the CTA 108 receives user input that indicates the action to be taken. For example, the user enters user input using a mouse or keyboard. In an embodiment, the user input activates either the join next conference selector 128 or the join with break selector 130. If the user activates the join next conference selector 128, the CTA 108 transmits a join request 116 to the server 104 to join the next conference using the same conference state and current client application. In an embodiment, the conference state comprises settings for the microphone and camera that were used for the previous conference. These settings are stored as the conference state and used for the next conference to provide a seamless transition to the next conference from the previous conference. After joining the next conference, the user's microphone is muted. By using the same client application to join the next conference, the transition becomes seamless since it is not necessary to remove and reload the client application to join the next conference.

In another embodiment, the user can transition to the next conference by selecting the join with break selector 130. In this mode, the user joins the upcoming conference with the same state and same client application used in the previous conference and with the microphone placed in the mute mode. However, in break mode, the live video stream of the user is replaced with a break icon informing the conference participants of the next conference that the user is currently on break. This allows the attendees of the upcoming conference to know that the user will be participating shortly but is taking a break. When the user returns from the break, the user can simply select the break/resume selector 134, which allows the user to resume participating in the next conference by replacing the break icon with the live video stream of the user. The break/resume selector 134 can also be used to allow the user to take a break during a current conference. In this case, when selecting the break/resume selector 134 the user's live video stream is replaced with the break icon and the microphone is muted. When the user returns from the break, the user again selects the break/resume selector 134 to resume participation in the current conference.

Therefore, in various an exemplary embodiments, the conference transition apparatus 108 allows a user to participate in a current conference and see status information about an upcoming conference. The status information includes a start time of the upcoming conference and images of participants that have already joined the upcoming conference.

The user can then seamlessly transition to the next conference by selecting the join next conference selector 128, as illustrated in the display 118. This selection will cause the user to leave the current conference and join the next conference using the same conference state and same client application. The user can also transition to the next conference by selecting the join with break selector 130, as illustrated in the display 118. This selection will cause the user to leave the current conference and join the next conference using the same conference state and same client application. However, the user's live video stream will be replaced with a break icon and the user's microphone will be muted. After the break, the user can resume participation in the new conference by selecting the break/resume selector 134.

Figure 2:
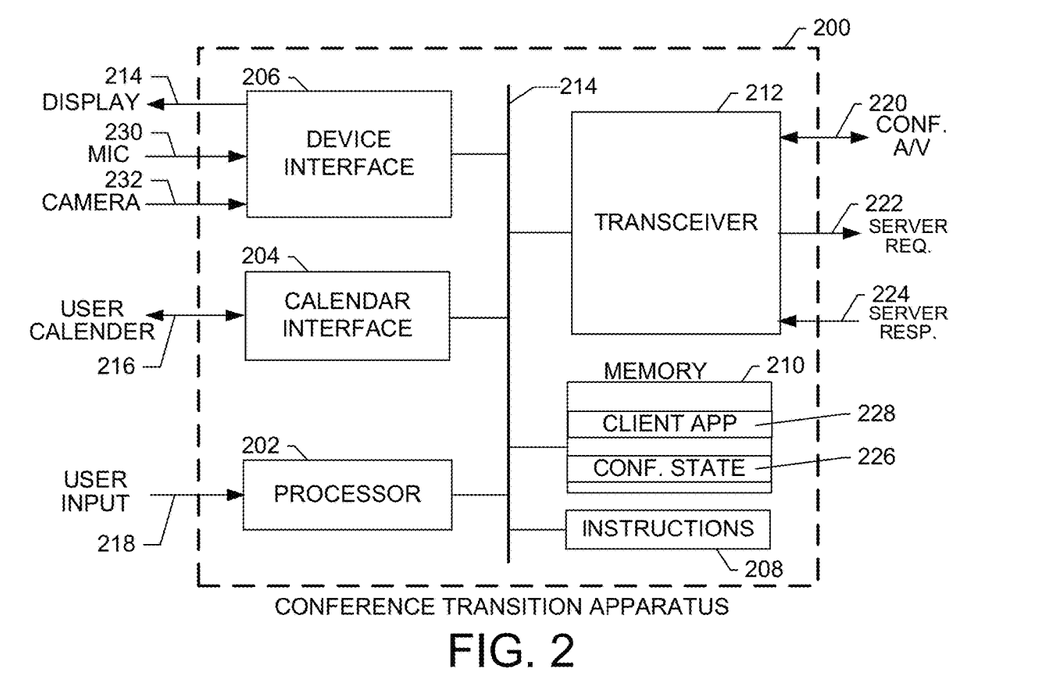
FIG. 2 shows an exemplary detailed embodiment of a conference transition apparatus that allows an attendee to seamlessly transition between network conferences.

FIG. 2 shows an exemplary detailed embodiment of a conference transition apparatus (CTA) 200 that allows an attendee to seamlessly transition between network conferences. For example, the CTA 200 is suitable for use as the conference transition apparatus 108 shown in FIG. 1. The CTA 200 comprises processor 202, calendar interface 204, device interface 206, instructions 208, memory 210, and transceiver 212 all connected to communicate over bus 214. The processor 202 executes the instructions 208 and utilizes the memory 210 and other functional blocks of the CTA 200 to perform the operations described herein.

During operation, the processor 202 receives user input 218 (e.g., mouse or keyboard inputs), and based on the user input, controls the transceiver 212 to join a current conference during which conference audio and video signals 220 are exchanged with other conference participants. For example, a client application 228 is downloaded and used to conduct the current conference. During the current conference, the processor 202 controls the device interface 206 to communicate with a display screen, microphone, and camera. For example, the device interface 206 outputs a display signal 214 that is displayed on the display screen. The device interface 206 also receives an audio signal 230 from a microphone and a video signal 232 from a camera.

In an embodiment, the processor 202 communicates with the calendar interface 204 to access a user calendar to obtain information about conferences the user is scheduled to attend. The conference information includes conference identifiers that identify each upcoming conference. For example, the calendar interface 204 communicates with the user's calendar application (e.g., Google, Yahoo, Outlook, or others) over signal path 216 to obtain a conference identifier and start time for the next scheduled conference. From the calendar information, the processor 202 generates a server request 222 that includes the conference identifier. The request 222 is transmitted to a conference server to obtain information about the upcoming conference. The conference server responds with a server response 224 that includes information about the upcoming conference. For example, the information includes the name/image of the conference host and images of conference participants that have already joined the upcoming conference.

In an embodiment, the processor 202 is aware of the start time of the upcoming conference. When there is less than five minutes until the start time of the upcoming conference, the processor 202 controls the device interface 206 to output a display signal 214 to display information about the upcoming conference on a user display screen. For example, the device interface 206 displays information about the current conference on the display screen 118 using display signal 214. The information about the current conference includes images 122 of the current participants. The processor 202 controls the device interface 206 to display images of participants 126 that have already joined the upcoming conference and the status 124 of the upcoming conference at a top portion of the display screen 118. It should be noted that the processor 202 can display the status information of the upcoming conference at any time and that the user can change the time when the status of the upcoming conference is displayed. Furthermore, the information can be presented on the user's display screen using any display technique, such as scrolling, wiping, fading in/out, or any other display technique.

The user has the option to seamlessly transition to the next conference by providing user input, for instance, by selecting the join NEXT selector 128 on the display. The user may also take a break by selecting the join with break selector 130 on the display. When selecting the join NEXT selector 128, the processor 202 receives this user input and generates a join request (e.g., server request 222) that is transmitted to the conference server to allow the user to join the upcoming conference. When joining the upcoming conference, the user joins the conference using the same client application 228 and current conference state 226, which includes the settings for the audio and video equipment of the user's equipment. The processor 202 maintains the state 226 and the client application 228 in the memory 210 so that these settings/application do not have to be reset or reloaded when joining the new conference. In addition, once the new conference is joined the microphone is placed in a mute mode so that the audio signal 230 is muted.

In another embodiment the user can join the upcoming conference but take a break by selecting the join with break selector 130. When the processor receives this user input, the processor generates the join request as before using the same client application 228 and conference state 226. The processor 202 controls the conference microphone to place it in a mute mode. The processor 202 replaces the live video stream 232 from the camera of the user equipment with a break icon (or other image) that is transmitted to other participants indicating that the user is on a break. When the user finishes the break, the user provides input to the processor 202, by selecting the break/resume selector 134, which re-enables the user's live video stream 232 to be transmitted so that the user can participate in the newly joined conference.

In various exemplary embodiments, the CTA 200 performs at least the following operations to provide seamless transition between network conferences.

1. Join a first conference using a client application and conference state that are saved in a memory of the user device.

2. Obtain calendar information that identifies an upcoming second conference.

3. Wait until a selected time interval before the start of the upcoming second conference. For example, wait until five minutes before the start of the upcoming conference.

4. Transmit a status request to a conference server that requests information about the upcoming second conference. The status request requests information, such as the name of the host and images of participants that have already joined the upcoming conference.

5. Display the information about the upcoming conference to the user during the current conference.

6. Receive a "join NEXT" input from the user that indicates that the user wants to join the upcoming conference. The current client application and conference state are maintained when joining the upcoming conference to provide a seamless transition and the microphone is muted.

7. Receive a "join with break" input from the user that indicates that the user wants to join the upcoming conference but wants to take a break. The current client application and conference state are maintained when joining the upcoming conference to provide a seamless transition and the microphone is muted. The user's live video stream is replaced with a break icon that is transmitted to the attendees of the upcoming conference.

8. After returning from the break, the user provides user input (e.g., selects the break/resume selector 134) to resume participation in the newly joined conference. The transmitted break icon is replaced with the user's live video stream.

Figure 3:
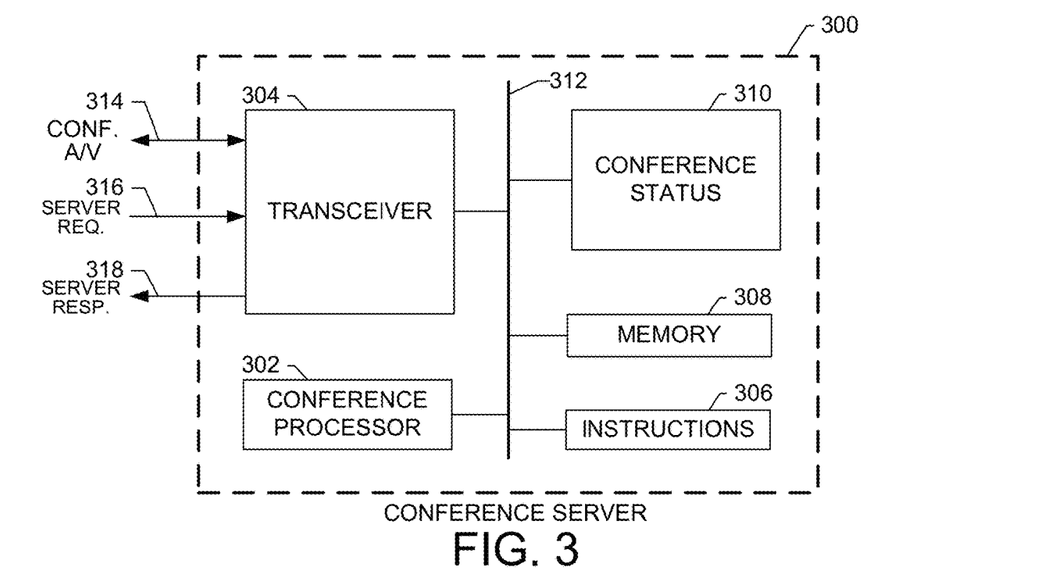
FIG. 3 shows an exemplary detailed embodiment of a conference server for use with the conference transition apparatus shown in FIG. 1.

FIG. 3 shows an exemplary detailed embodiment of a conference server 300. For example the conference server 300 is suitable for use as the conference server 104 shown in FIG. 1. The conference server comprises a conference processor 302, transceiver 304, instructions 306, memory 308, and a conference status memory 310, all connected to communicate over bus 312.

During operation, the conference processor 302 executes instructions 306 and utilizes the memory 308 to perform the operations of the conference server described herein. The transceiver 304 communicates with network participants using a network, such as the network 106 shown in FIG. 1. The transceiver 304 receives server requests 316 from network participants and processes these requests to enable network conferences between the network participants. For example, during a network conference, audio and video signals 314 are exchanged between the conference participants.

During operation, the conference server 300 facilitates a network conference between multiple participants. The conference server 300 also maintains conference status 310, which describes current and upcoming network conferences. For example the conference status 310 describes information about an upcoming conference, such as a conference identifier, the name/image of the conference host, the topic of the conference, the invited participants to the conference, and the participants that have already joined the conference.

In an embodiment, user equipment, such as user equipment 102 shown in FIG. 1, participates in a current network conference. The user equipment comprises the CTA 200 that sends a request 316 to the conference server requesting status of an upcoming conference. The request includes a conference identifier and is received by the transceiver 304 and passed to the conference processor 302. The conference processor 302 uses the identifier to access the conference status 310 to retrieve the requested information. The conference processor 302 transmits the requested information using the transceiver 304 by generating a server response 318 that is sent to the requesting user equipment. In an embodiment, the status information includes the name, start time, host name/image, participant names/images, and names/images of participants that have already joined the upcoming conference. Therefore, in accordance with the various embodiments of the invention, it is possible for an attendee of a current conference to request status information concerning an upcoming conference. The status information is used to allow the requesting attendee to seamlessly transition from the current conference to the upcoming conference.

Figure 4:
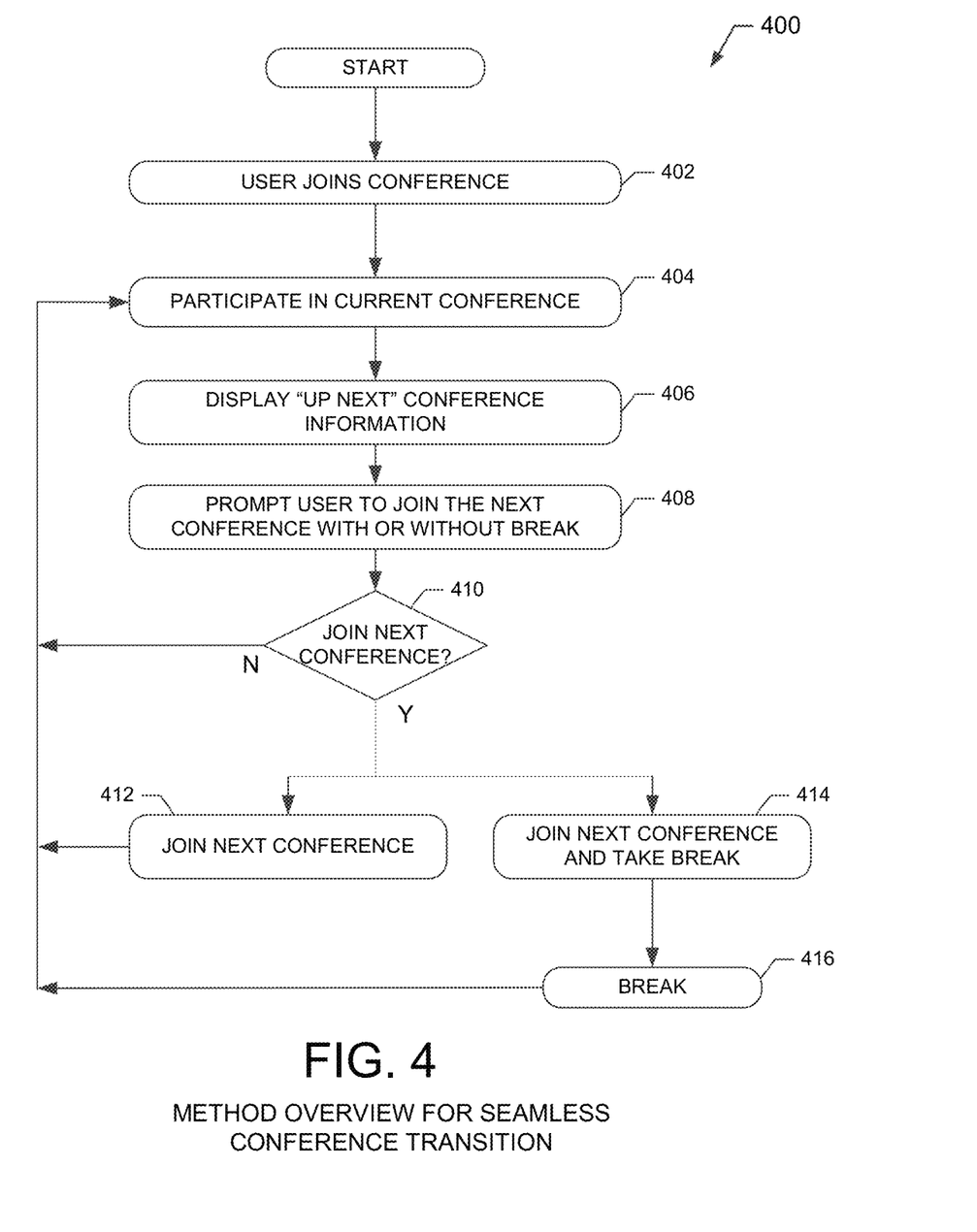
FIG. 4 shows an exemplary method for providing seamless conference transitions in accordance with various exemplary embodiments.

FIG. 4 shows an exemplary method 400 for providing seamless conference transitions in accordance with various exemplary embodiments. For example, in an embodiment, the method 400 is performed by the conference transition apparatus 108 shown in FIG. 1 or the CTA 200 shown in FIG. 2

At block 402, a user joins a conference. For example, the user controls the user equipment 102 to communicate with the server 104 to join a network conference. In an embodiment, a conference client application is downloaded and used to allow the user to participate in the current conference.

At block 404, the user participants in the current conference. For example, the user of UE 102 participates in a current conference using the conference client application as indicated at 110.

At block 406, during the current conference, status information regarding an upcoming conference is displayed to the user. The status information includes the time of the conference, the name of the conference host, and images of conference attendees that have already joined the upcoming conference. For example, the CTA 108 obtains information about the upcoming conference and displays the next conference details 124 and next conference participants 126 on the display screen 118.

At block 408, the user is prompted to choose whether to join the next conference with or without a break. For example, the join NEXT selector 128 and the join with break selector 130 are displayed to the user, as shown in the display screen 118.

At block 410, a determination is made as to whether the user will seamlessly join the upcoming conference. For example, the user views a display of upcoming conference status information during the pending conference. The user can select to join the upcoming conference in a seamless fashion where the client application and state of the current conference is maintained when the user joins the upcoming conference. The user can also join the upcoming conference and then take a break. If the user decides not to join the upcoming conference, the method continues back to block 404 where the user continues to participate in the current conference. If the user decides to join the upcoming conference, the method continues to block 412. If the user wishes to join the upcoming conference and take a break, the method proceeds to block 414.

At block 412, the user seamlessly joins the upcoming conference. For example, the user selects the next conference selector 128 to seamlessly join the upcoming conference. The microphone and video settings of the user's equipment are maintained and the same client application is used when joining the upcoming conference. After joining the conference, the user's microphone is placed in the mute state. The method then proceeds to block 404 where the user participates in the newly joined conference.

At block 414, the user seamlessly joins the upcoming conference and then takes a break. For example, the user selects the join with break selector 130 to seamlessly join the upcoming conference and then take a break. The microphone and video settings of the user's equipment are maintained and the same client application is used when joining the upcoming conference. After joining the conference, the microphone is placed in the mute state and a break icon is transmitted in place of the user's live video stream.

At block 416, the user takes a break and when returning provides user input that indicates that the break is over. The user's live video stream is transmitted allowing the participants of the upcoming conference to see the user. The user's microphone is also unmuted. The method then proceeds to block 404 where the user participants in the newly joined conference.

Thus, the method 400 describes operations for seamless conference transitions in accordance with various exemplary embodiments. It should be noted that the operations of the method 400 are exemplary and not limiting of the scope of the embodiments. Furthermore the operations of the method 400 can be changed, deleted, rearranged, added to, or otherwise modified within the scope of the embodiments.

Figure 5:
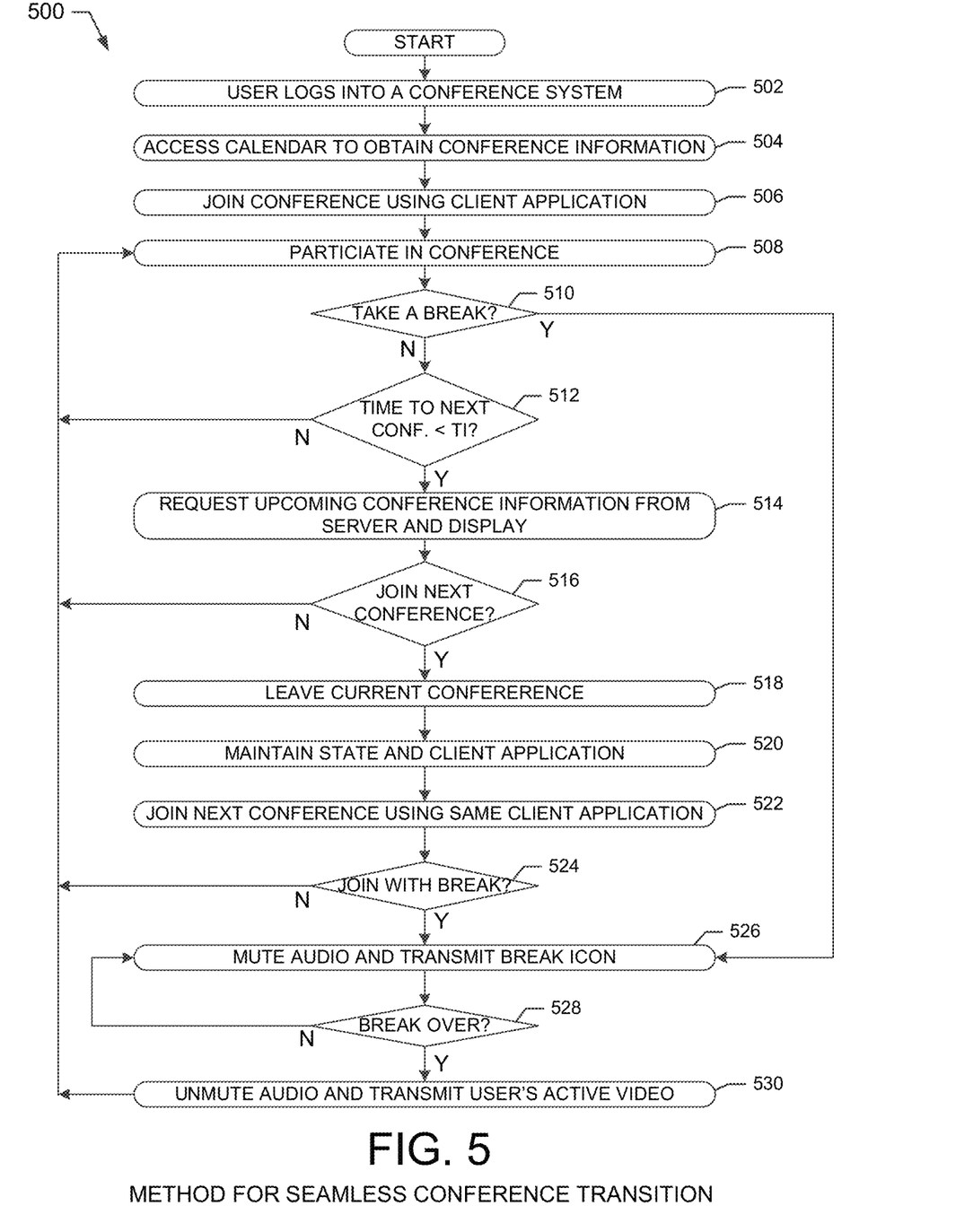
FIG. 5 shows an exemplary detailed method for providing seamless conference transitions in accordance with various exemplary embodiments.

FIG. 5 shows an exemplary detailed method 500 for providing seamless conference transitions in accordance with various exemplary embodiments. For example, in an embodiment, the method 500 is performed by the CTA 108 shown in FIG. 1 or the conference transition apparatus 200 shown in FIG. 2.

At block 502, a user logs into a conference system. For example, the user of the UE 102 logs into the conference server 104.

At block 504, conference information is obtained from a user's calendar. For example, if the user maintains a calendar, such as an Outlook or Google calendar, information about upcoming conferences is obtained from the calendar. For example, the processor 202 controls the calendar interface 204 to access a calendar maintained by the user. The calendar includes conference identifiers for upcoming conferences that the user is scheduled to join.

At block 506, the user joins a network conference. For example, the UE 102 communicates with the network server 104 to join a network conference. For example, a client application 228 is downloaded to the user equipment 102 and used to allow the user to join the network conference.

At block 508, the user participates in the conference. For example, the user participates in the current conference, as indicated at 110.

At block 510, a decision is made by the user whether or not to take a break. For example, the user can select a break/resume selector 134 as user input to the UE 102. If the user decides to take a break and selects the selector 134, the method proceeds to block 526. If the user does not want a break the method proceeds to block 512.

At block 512, a determination is made as to whether the time remaining before the next scheduled conference (e.g., Up-Next) is less than a selected time interval (TI). For example, the time interval can be five minutes or any other desired time interval. In an embodiment, the processor 202 is aware of the user's conference schedule obtained from the user's calendar and determines if the time to the next scheduled conference is less than the selected TI. For example, if the TI is five minutes and there is less than five minutes to the next conference, the method proceeds to block by 514. If the time until the next conference is greater than the selected TI, the method proceeds back to block 508.

At block 514, a request for upcoming conference information is made to the conference server. The request includes a request for the name of the host and video images of the conference participants that have already joined the upcoming conference. For example, the processor 202 generates the request to include the conference identifier and controls the transceiver 212 to transmit the request 222 to the network server. The server transmits a server response 224 that includes the requested information. This information is then displayed to the user, for example, as part of the next conference details 124 and the next conference participant images 126.

At block 516, a decision is made as to whether or not to join the next conference. If the user decides not to join the next conference, the method proceeds to block 508 where the user participates in the current conference. If the user decides to join the next conference, the method proceeds to block 518.

At block 518, the user exits from the current conference. For example, if the user is a participant of the current conference, the user simply leaves the current conference. If the user is a host of the current conference, the user performs any necessary operations to end the current conference.

At block 520, the conference state and client application are maintained when the user leaves or ends the current conference. For example, the conference state includes the microphone settings and the camera settings utilized by the user in the previous conference. The processor 202 stores this state 226 information in the memory 210. The client application 228 used for the previous conference is also maintained in the memory 210.

At block 522, the user joins the next conference using the same client application 228 and with the conference state 226 that was stored from the previous conference. The user's microphone is muted after joining the next conference. For example, the processor 202 executes the client application 228 to communicate with the network server 104 to join or host the next conference. Since the same conference state 226 and client application 228 are utilized, the transition to the next conference is seamless, which is efficient and reduces transition time.

At block 524, a determination is made as to whether the user wants to take a break before joining the next conference. For example, the user may have selected the join with break selector 130 when joining the next conference. If the user did not select the join with break selector 130, the method proceeds to block 508 where the user participates in the newly joined conference. If the user did select the join with break selector 130, the method proceeds to block 526.

At block 526, the user's audio signal 230 is muted in the user's live video stream 232 is replaced with a break icon that is transmitted to participants of the next conference. For example, the break icon could be a coffee cup or other icon that indicates that the user is taking a break.

At block 528, a determination is made as to whether or not the break is over. If the break is not over, the method proceeds back to block 526. If the user provides input to indicate that the break is over, such as selecting the break/resume selector 134, the method proceeds to block 530.

At block 530, the user's microphone audio signal 230 is unmuted and the break icon is changed to transmit the user's live video stream 232 to allow the user to participate in the newly joined conference. The method then proceeds to block 508.

Thus, the method 500 describes operations for providing seamless conference transitions. For example, in an embodiment, the method performs operations for transitioning between network conferences. The method comprises attending a first network conference using a first conference state and a conferencing application, and displaying, on a display screen, Up-Next conference status comprising a meeting time for a second network conference and images of attendees that have joined the second network conference. The method also comprises joining the second network conference using the first conference state and the conferencing application. It should be noted that the operations of the method 500 are exemplary and not limiting of the scope of the embodiments. Furthermore the operations of the method 500 can be changed, deleted, rearranged, added to, or otherwise modified within the scope of the embodiments.

Figure 6A:
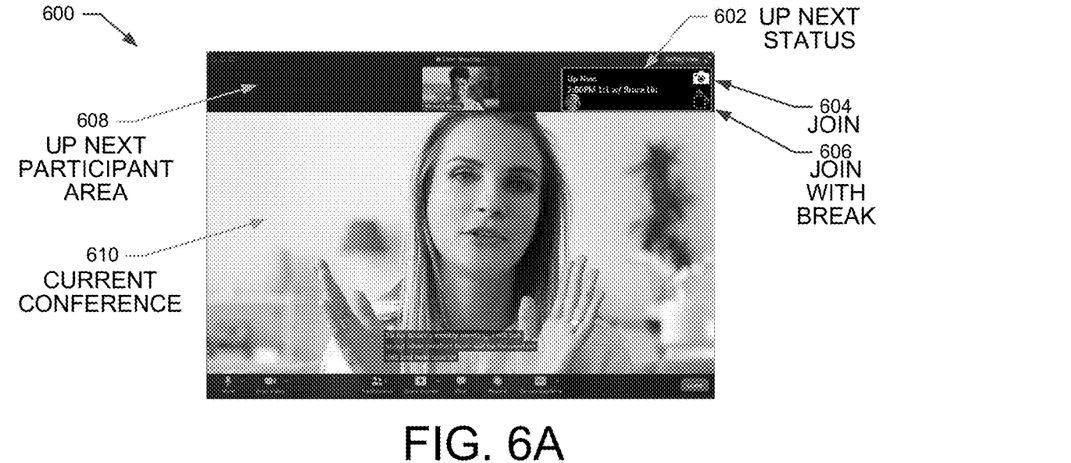
FIGS. 6A-C show exemplary screen shots illustrating operation of a conference transition apparatus to provide seamless conference transitions in accordance with various exemplary embodiments.
Figure 6B:
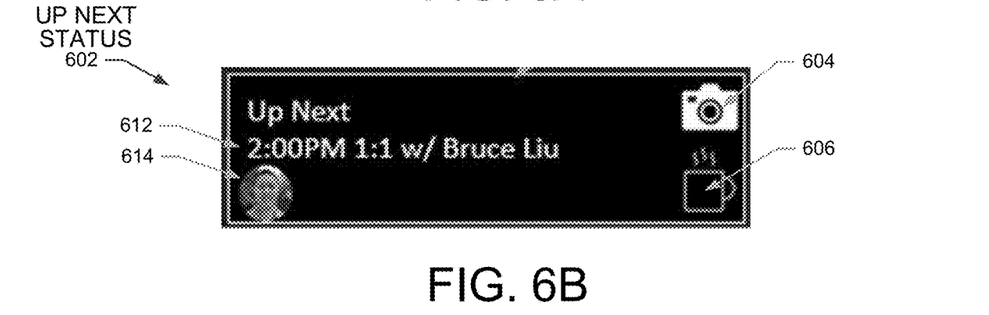
Figure 6C:
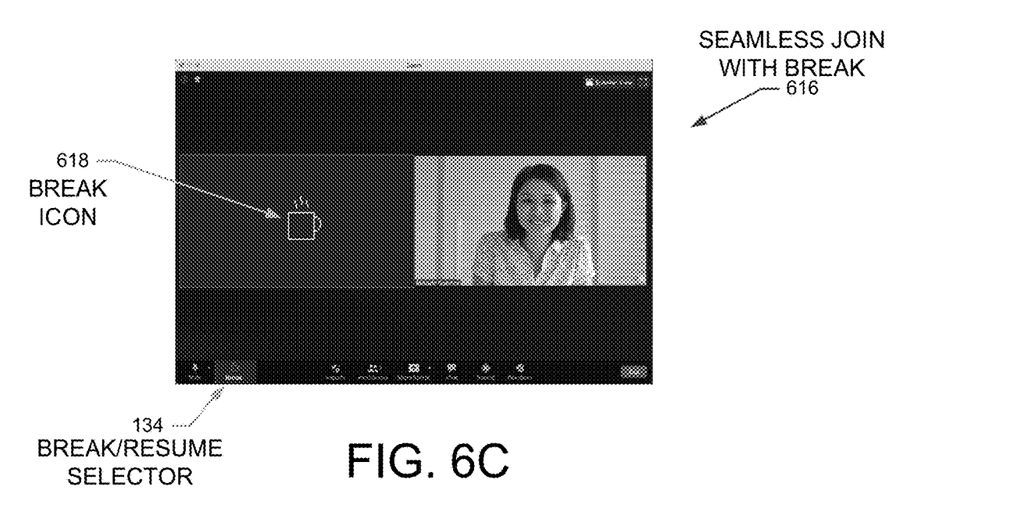

FIGS. 6A-C show exemplary screen shots illustrating operation of a conference transition apparatus to provide seamless conference transitions in accordance with various exemplary embodiments.

FIG. 6A shows a screen shot 600 illustrates a current conference 610 in which Up-Next status 602 is displayed when the time for the next scheduled conference is less than a selected time interval from the current time. The Up-Next status 602 includes a join selector 604 and a join with break selector 606. The screen shot 600 also illustrates an Up-Next participant area 608 that displays user images of participants that have already joined the next conference.

FIG. 6B shows the Up-Next status 602 display. In an embodiment, the Up-Next status 602 comprises conference details 612, such as conference time and host name. The Up-Next status 602 also comprises a host image 614 and the join 604 and join with break 606 selectors.

FIG. 6C shows a screen shot 616 that is presented when the join with break selector 606 is selected. In this case, the user seamlessly joins the next conference but the user's transmitted live video stream is replaced with the break icon 618. After completing the break, the user can select the break/resume selector 134 to return to the newly joined conference. In this case, the transmitted break icon 618 is replaced with the user's live video stream.

Figure 7:
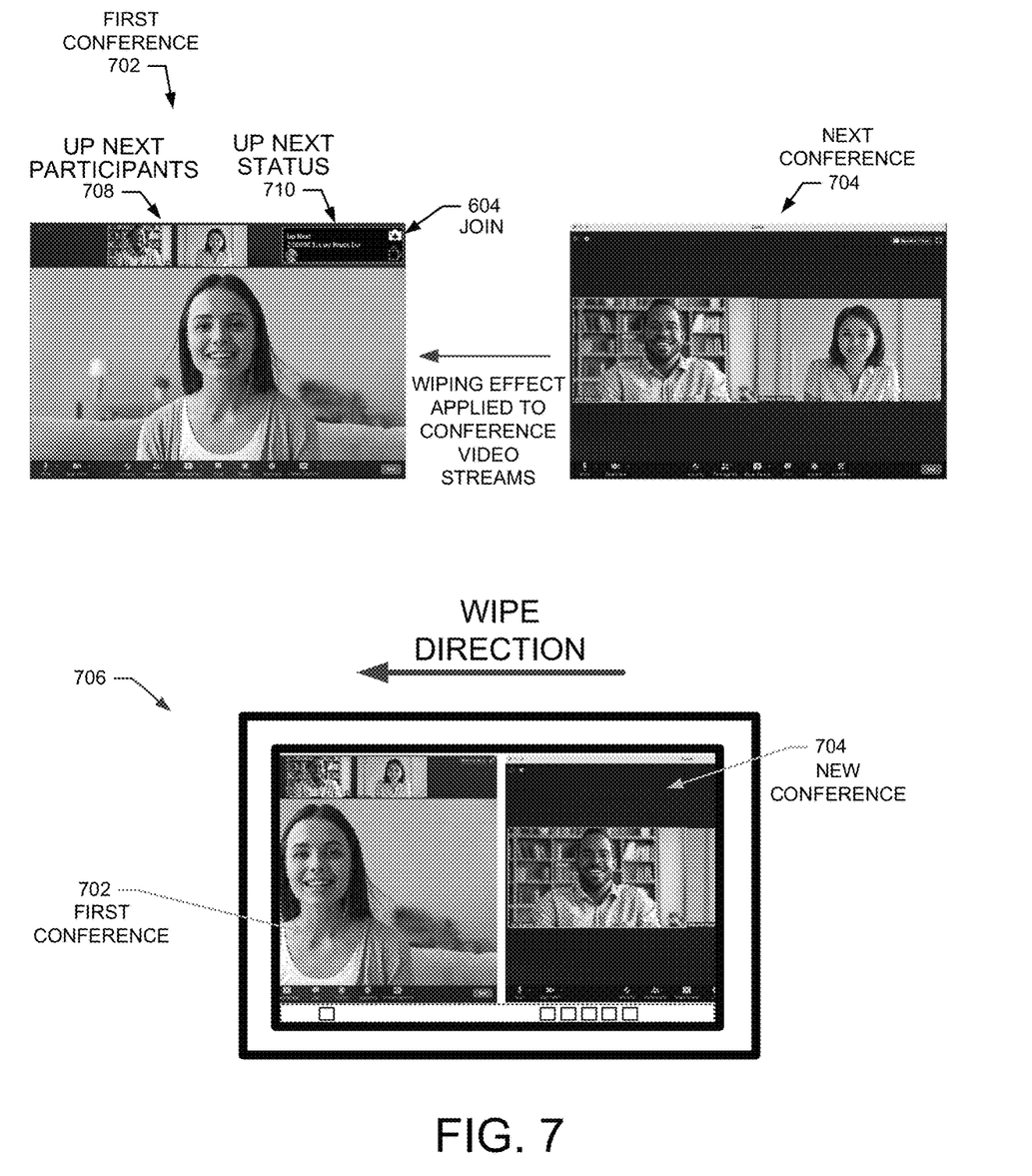
FIG. 7 show exemplary screen shots illustrating operation of a conference transition apparatus to provide seamless conference transitions in accordance with various exemplary embodiments.

FIG. 7 show exemplary screen shots illustrating operation of a conference transition apparatus to provide seamless conference transitions in accordance with various exemplary embodiments. For example, the screen shots illustrated in FIG. 7, demonstrate the operation of a user transitioning to a new conference after selecting the join selector 604 shown in FIG. 6A.

The screen shot 702 illustrates a first conference in which the user participates. The display of the first conference 702 includes a display of up-NEXT status 710 that provides status details of a next conference 704. The display of the first conference 702 also includes images 708 of participants that have already joined the next conference 704. After selecting the join selector 604, the user seamlessly joins the next conference 704. For example, the seamless transition occurs because the next conference 704 is joined using the same conference state and client application that were saved from the first conference 702. When seamlessly joining the next conference 704, a "wiping" display effect is utilized to wipe the first conference 702 off the display and simultaneously wipe the next conference 704 onto the display.

In an embodiment, the user's display is updated to show the transition from the first conference 702 to the next conference 704 using a wiping effect. For example, as illustrated in the screen shot 706, the first conference 702 is wiped away in the wipe direction (e.g., right to left) and the next conference 704 is wiped onto the screen. It should be noted that the wiping display effect is exemplary and that any other display effect or technique can be utilized to display the seamless transition from the first conference 702 to the next conference 704.

Figure 8:
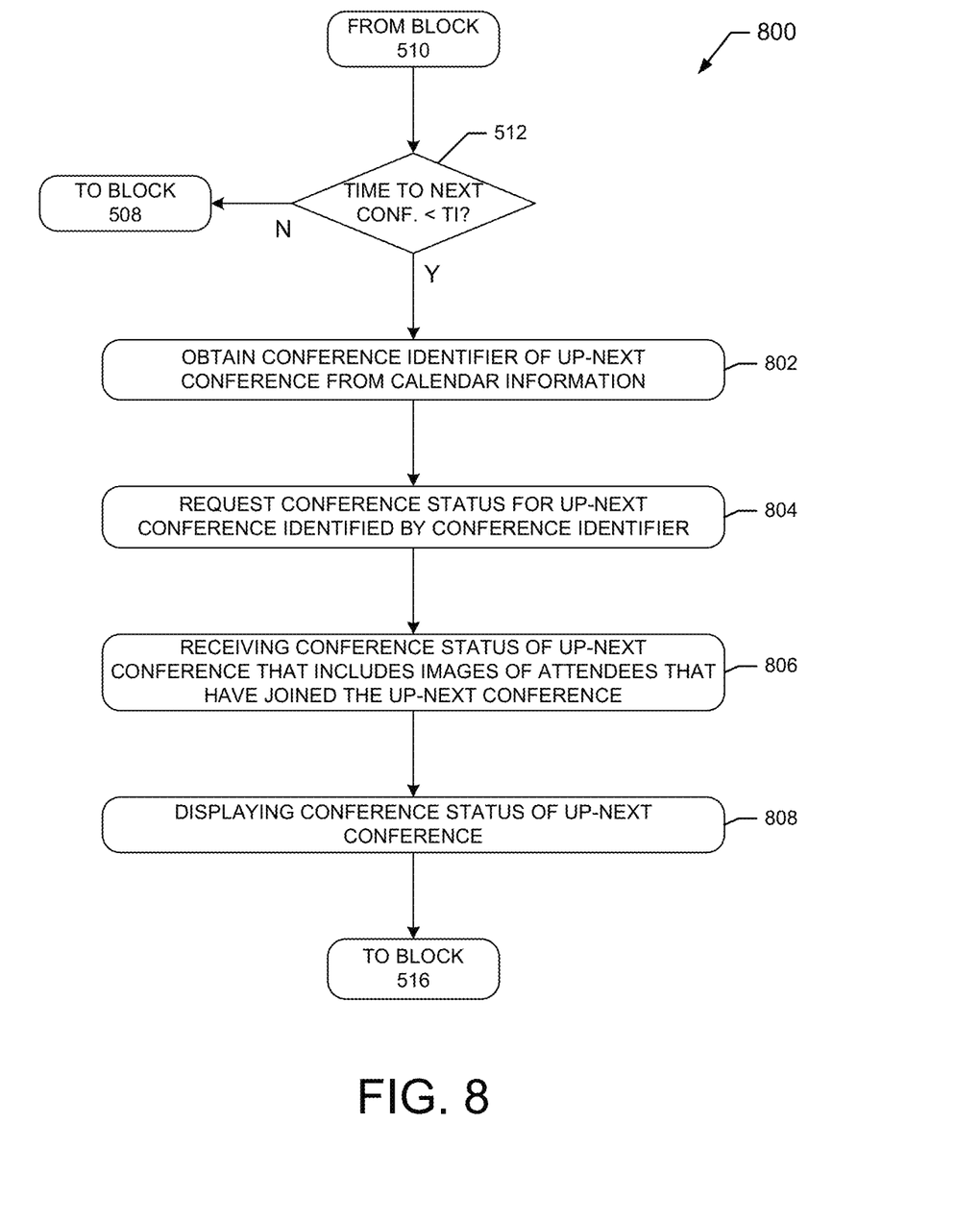
FIG. 8 shows an exemplary detailed method for obtaining and displaying Up-Next conference status.

FIG. 8 shows an exemplary detailed method 800 for obtaining and displaying Up-Next conference status. For example, in an embodiment, the method 800 describes operations at blocks 802-808 that are performed within the block 514 shown in FIG. 5.

At block 512, a determination is made as to whether the time remaining before the next scheduled conference is less than a selected time interval (TI). For example, the time interval can be five minutes or any other desired time interval. In an embodiment, the processor 202 is aware of the user's conference schedule obtained from the user's calendar and determines if the time to the next scheduled conference is less than the selected TI. If the time to the next conference is less than the selected TI, the method proceeds to block by 802. If the time until the next conference is greater than the selected TI, the method proceeds back to block 508.

At block 802, the conference identifier is obtained from the Up-Next conference information that is retrieved at block 504. For example, the processor 202 retrieves Up-Next conference information from a user's calendar or other database that includes information and times for conferences that the user desires to attend. For example, the processor 202 controls the calendar interface 204 to obtain the user's Up-Next conference information from the user's calendar. For example, the calendar information may describe a first conference scheduled for 1 μm and a second conference scheduled for 2 pm. Each conference has an associated start time and identifier. When the user is participating in the first conference, the Up-Next conference is the second conference scheduled for 2 pm.

At block 804, a request for status information for the Up-Next conference is made to a conference server or other entity with knowledge of the Up-Next conference. The request includes the conference identifier associated with the Up-Next conference. For example, the processor 202 generates the request to include the Up-Next conference identifier and controls the transceiver 212 to transmit the request to a conference server as part of a server request 222.

At block 806, the conference status information of the Up-Next conference is received. In an embodiment, the conference server transmits the Up-Next conference status information to the user's device. For example, the transceiver 212 receives the Up-Next conference status in a server response 224 and passes this information to the processor 202. In an embodiment, the Up-Next conference status includes the name/image of the conference host, topic of the conference, list of invited attendees, and name/image of attendees that have already joined the Up-Next conference.

At block 808, the status of the Up-Next conferences is displayed to the user. For example, the processor 202 controls the device interface 206 to display the Up-Next conference status on a display of the user's equipment. In an embodiment, the Up-Next conference status that is displayed includes the Up-Next status (e.g., Up-Next status 710) and the Up-Next participants 708 that have already joined the Up-Next conference. The method then proceeds to block 516.

Thus, the method 800 describes operations for retrieving and displaying Up-Next conference status. In an embodiment, the method 800 performs operations for displaying Up-Next conference status. The operations comprise attending a first network conference, obtaining a meeting identifier and a meeting time for a second network conference, requesting conference status information for the second network conference based on the meeting identifier, wherein the conference status information includes images of attendees that have joined the second network conference, receiving the conference status information, and displaying Up-Next conference status during the first network conference, wherein the Up-Next conference status comprises the meeting time and the images of the attendees that have joined the second network conference.

It should be noted that the operations of the method 800 are exemplary and not limiting of the scope of the embodiments. Furthermore the operations of the method 800 can be changed, deleted, rearranged, added to, or otherwise modified within the scope of the embodiments.

Figure 9:
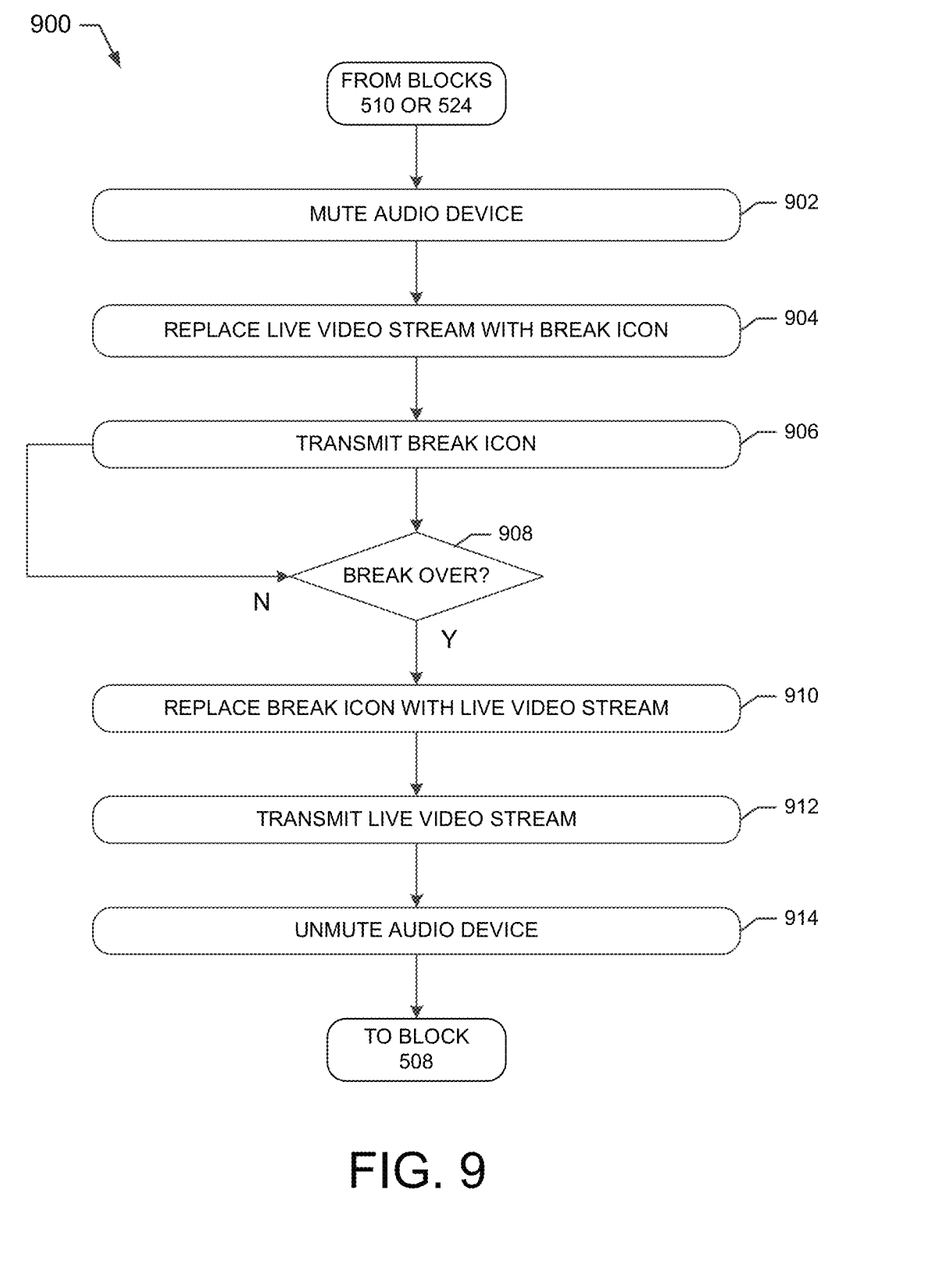
FIG. 9 shows an exemplary detailed method for taking a break during a network conference.

FIG. 9 shows an exemplary detailed method 900 for taking a break after a seamless transition between network conferences. For example, in an embodiment, the method 900 describes operations at blocks 902-909 that are performed within the blocks 526, 528, and 530 shown in FIG. 5.

At block 902, a decision to take a break during a current conference or when joining an Up-Next conference has been made. For example, block 902 is entered from block 510 when a decision is made to take a break during a current conference. Block 902 also is entered when a decision to take a break is made when joining an Up-Next conference at block 524. The decision to take a break is determined from user input, such as when the user selects the join with break selector 606. When the user input to take a break is received, the audio signal 230 from the audio device (microphone) is muted. In an embodiment, the device interface 206 blocks the audio signal 230 when the microphone is muted.

At block 904, the live video stream transmitted from the user's equipment is replaced with a break icon. For example, as illustrated in FIG. 6C, the break icon 618 replaces the user's live video stream. In an embodiment, the processor 202 obtains the break icon image from the memory 210 and replaces the live video stream 232 from the camera with this icon image.

At block 906, the break icon is transmitted in place of the user's live video stream. For example, the processor 202 controls the transceiver 212 to transmit the break icon during the current conference or the newly joined conference instead of the user's live video stream.

At block 908, a determination is made as to whether the break is over. For example, the user provides user input to indicate that the break is over. In an embodiment, the user selects the break/resume selector 134 to indicate that the break is over. If the user indicates that the break is not over, the method proceeds to block 906. If the user indicates that the break is over, the method proceeds to block 910.

At block 910, the break icon is replaced with the user's live video stream. In an embodiment, the processor 202 replaces the break icon with the user's live video stream 232 from the camera.

At block 912, the user's live video stream is transmitted in place of the break icon. For example, the processor 202 controls the transceiver 212 to transmit the user's live video stream during the current conference or the newly joined conference instead of the break icon.

At block 914, the audio signal 230 from the audio device (microphone) is unmuted. In an embodiment, the processor 202 controls the device interface 206 to allow the audio signal 230 to be transmitted during the conference. The method then proceeds to block 508 shown in FIG. 5.

Thus, the method 900 describes operations for taking a break after a seamless transition between network conferences. In an embodiment, a method is provided for taking a break after a transition between network conferences. The method includes operations of attending a first network conference using a first conference state and a conferencing application, and displaying Up-Next conference status about a second network conference. The method also includes operations of receiving a request to enter a break mode after joining the second network conference, joining the second network conference using the first conference state and the conferencing application, and transmitting a break mode icon to participants in the second network conference. It should be noted that the operations of the method 900 are exemplary and not limiting of the scope of the embodiments. Furthermore the operations of the method 900 can be changed, deleted, rearranged, added to, or otherwise modified within the scope of the embodiments.

The exemplary embodiments described herein are implemented using customized hard-wired logic, one or more ASICs or FPGAs, firmware and/or program logic which in combination with a computer system causes or programs the disclosed apparatus to be a special-purpose machine. According to one embodiment, the operations described herein are performed by a processor or computer executing one or more sequences of one or more instructions contained in memory. Such instructions may be read into memory from another storage medium. Execution of the sequences of instructions contained in memory causes a processor to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks, such as memory 404 or instructions memory 412. Volatile media includes dynamic memory. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics. Transmission media can also take the form of acoustic or light waves, such as those generated during radio-wave and infra-red data communications.

Various forms of media may be involved in carrying one or more sequences of one or more instructions to a disclosed processor for execution. For example, the instructions may initially be carried on a magnetic disk or a solid-state drive of a remote computer. The remote computer can load the instructions into its dynamic memory and send the instructions over a telephone line using a modem. A local modem can receive the data on the telephone line and use an infra-red transmitter to convert the data to an infra-red signal. An infra-red detector can receive the data carried in the infra-red signal and appropriate circuitry can place the data on a data bus, for instance bus 214, which carries the data to memory 212, from which processor 202 retrieves and executes the instructions. The instructions may optionally be stored on a storage device either before or after execution by processor 202.

The exemplary embodiment of the present invention includes various processing steps described herein. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from this exemplary embodiments of the present invention and its broader aspects. Therefore, the appended claims are intended to encompass within their scope all such changes and modifications as are within the true spirit and scope of this exemplary embodiments of the present invention.

That which is claimed is:

1. A method comprising:
   providing, by a user device, an indication of an upcoming conference during a conference;
   receiving, by the user device, a request to join the upcoming conference using a break mode; and
   joining, by the user device, the upcoming conference using the break mode.

2. The method of claim 1, further comprising:
   after joining the upcoming conference, transmitting a break icon to participants in the upcoming conference, wherein the break icon is associated with the user device and indicates that the user device is on a break.

3. The method of claim 1, further comprising muting a microphone connected to the user device.

4. The method of claim 1, further comprising:
   initiating a display of conference settings on the user device for the upcoming conference, the conference settings based on prior conference settings applied during a prior conference; and
   wherein joining the upcoming conference comprises joining the upcoming conference using the conference settings.

5. The method of claim 1, further comprising:
   wherein joining the user device to the upcoming conference immediately follows leaving a prior conference.

6. The method of claim 1, further comprising receiving, by the user device, a duration of the break mode.

7. The method of claim 6, further comprising:
   after joining the upcoming conference, transmitting a break icon to participants in the upcoming conference and an indication of the duration of the break mode, wherein the break icon is associated with the user device and indicates that the user device is on a break.

8. The method of claim 1, wherein the user device is automatically joined to the upcoming conference when the upcoming conference starts and wherein the user device is joined to the upcoming conference with an audio input of the user device muted.

9. A device comprising:
   a communications interface;
   a non-transitory computer-readable medium; and
   one or more processors communicatively coupled to the communications interface and the non-transitory computer-readable medium, the one or more processors configured to execute processor-executable instructions stored in the non-transitory computer-readable medium to:
   provide an indication of an upcoming conference during a conference;
   receive a request to join the upcoming conference using a break mode; and
   join the upcoming conference using the break mode.

10. The device of claim 9, wherein the one or more processors are configured to execute further processor-executable instructions stored in the non-transitory computer-readable medium to:
   after joining the upcoming conference, transmit a break icon to participants in the upcoming conference, wherein the break icon is associated with a user of the device and indicates that the user is on a break.

11. The device of claim 9, wherein the one or more processors are configured to execute further processor-executable instructions stored in the non-transitory computer-readable medium to mute a microphone connected to the device.

12. The device of claim 9, wherein the one or more processors are configured to execute further processor-executable instructions stored in the non-transitory computer-readable medium to:
 initiate a display of conference settings on the device for the upcoming conference, the conference settings based on prior conference settings applied during a prior conference; and
 join the upcoming conference using the conference settings.

13. The device of claim 9, wherein joining the device to the upcoming conference immediately follows leaving a prior conference.

14. The device of claim 9, wherein the one or more processors are configured to execute further processor-executable instructions stored in the non-transitory computer-readable medium to receive a duration of the break mode.

15. The device of claim 14, wherein the one or more processors are configured to execute further processor-executable instructions stored in the non-transitory computer-readable medium to:
 after joining the upcoming conference, transmit a break icon to participants in the upcoming conference and an indication of the duration of the break mode, wherein the break icon is associated with the user of the device and indicates that the user is on a break.

16. The device of claim 9, wherein the device is automatically joined to the upcoming conference when the upcoming conference starts and wherein the device is joined to the upcoming conference with an audio input of the device muted.

17. A non-transitory computer-readable medium comprising processor-executable instructions configured to cause one or more processors to:
 provide an indication of an upcoming conference during a conference;
 receive a request to join the upcoming conference using a break mode; and
 join the upcoming conference using the break mode.

18. The non-transitory computer-readable medium of claim 17, further comprising processor-executable instructions configured to cause the one or more processors to:
 after joining the upcoming conference, transmit a break icon to participants in the upcoming conference, wherein the break icon is associated with a user of a user device and indicates that the user device is on a break.

19. The non-transitory computer-readable medium of claim 17, further comprising processor-executable instructions configured to cause the one or more processors to mute a microphone.

20. The non-transitory computer-readable medium of claim 17, further comprising processor-executable instructions configured to cause the one or more processors to:
 initiate a display of conference settings on a user device for the upcoming conference, the conference settings based on prior conference settings applied during a prior conference; and
 join the upcoming conference using the conference settings.

* * * * *